Patented Sept. 24, 1929

1,729,423

UNITED STATES PATENT OFFICE

WILLIAM J. HARSHAW, OF SHAKER HEIGHTS VILLAGE, AND GEORGE L. HOMER, OF CLEVELAND, OHIO, ASSIGNORS TO THE HARSHAW CHEMICAL COMPANY, OF CLEVELAND, OHIO, A CORPORATION OF OHIO

EXTRACTION OF COPPER-NICKEL MATTE

No Drawing. Application filed April 28, 1926. Serial No. 105,259.

This invention relates more particularly to the working up of copper-nickel matte, or Bessemer matte as it is commonly called, to obtain the nickel and copper therefrom. Such material as received from the matte furnace contains nickel, copper and sulphur, with small percentages of silica, iron, cobalt, etc., and is not a true sulphide, there being quite a content of free nickel in solid solution. Attempts have been made to handle such material by leaching with sulphuric acid. This removes about twenty to thirty-five per cent of the nickel, but no satisfactory method has been known for working up the insoluble residue. A process which can obtain all of the values and in an efficient manner is accordingly highly desirable.

To the accomplishment of the foregoing and related ends, the invention, then consists of the steps hereinafter fully described, and particularly pointed out in the claims, the following description setting forth, however, but one of various forms in which the principle of the invention may be used.

In carrying out our invention, the matte is ground to approximately ten mesh and finer, and is leached with hot dilute sulphuric acid. The residue is preferably ground further, although this is not always necessary, and is roasted. A temperature of about 300° to 500° C. is best, although temperatures somewhat higher or lower can be used. A temperature however as high as 800° C. is unsatisfactory for this process and should be avoided. This roasting converts part of the copper sulphide and part of the nickel sulphide to products which are soluble in dilute sulphuric acid. We now leach with a calculated quantity of dilute sulphuric acid and obtain the soluble copper in solution as the sulphate. A small quantity of nickel may also be taken into solution, but this can be readily separated from the copper solution by fractional crystallization or other desired means. The residue from this copper leaching is now leached again with a calculated quantity of sulphuric acid, and a large percentage of the nickel present is taken into solution as sulphate. There is some liberation of hydrogen sulphide, and any soluble copper that has escaped the copper leaching may pass into solution now but is quickly precipitated by the hydrogen sulphide being evolved. The nickel sulphate obtained is practically pure except for small quantities of cobalt and iron which may be present in the original matte. This nickel solution can be combined with the first nickel sulphate solution. We next re-roast the insoluble residue from the last leaching, and further quantities of copper and nickel are thereby rendered soluble. This is leached with a calculated quantity of dilute sulphuric acid again, and copper sulphate in solution is first obtained. A further leaching is carried out with fresh dilute sulphuric acid and this yields nickel sulphate. By further roastings and leachings, the residue can be worked clear out. In practice however, we prefer after we have roasted and leached to remove the copper, to add to the residue from this leaching enough new matte to bring the weight of the batch to approximately the same as that started with and leach the soluble nickel from the matte and residue together; or less desirably, we can keep adding to the batch that we roast enough of the matte that has been leached once for the removal of nickel to keep the weight of this batch approximately constant. In this manner a conveniently workable batch is always maintained in operation, while at the same time the values in the various components are being progressively taken out.

Other modes of applying the principle of our invention may be employed, change being made as regards the steps of operation, provided the steps stated in any of the following claims or the equivalent of such stated steps be employed.

We therefore particularly point out and distinctly claim as our invention:—

1. A process of separating nickel and copper, which includes the steps of grinding a nickel-copper matte, leaching with acid, lightly roasting, and again leaching with acid.

2. A process of separating nickel and copper, which includes the steps of grinding a nickel-copper matte, leaching with dilute sulphuric acid, lightly roasting, and again leaching with dilute sulphuric acid.

3. A process of separating nickel and copper, which includes the steps of grinding a nickel-copper matte, leaching with dilute sulphuric acid, lightly grinding the residue, roasting, leaching with successive charges of dilute sulphuric acid, roasting, and again leaching with successive charges of dilute sulphuric acid.

4. A process of separating nickel and copper, which includes the steps of grinding a nickel-copper matte, leaching with dilute sulphuric acid, grinding the residue, roasting at a temperature below 800° C., leaching with dilute sulphuric acid, leaching again with dilute sulphuric acid, roasting at a temperature below 800° C., and leaching with dilute sulphuric acid.

5. A process of separating nickel and copper, which includes the steps of grinding the matte, leaching with dilute sulphuric acid, grinding the residue, roasting, leaching with dilute sulphuric acid, adding additional matte, leaching with dilute sulphuric acid, roasting, and fractional leaching with dilute sulphuric acid.

6. A process of separating nickel and copper, which includes the steps of grinding the matte, leaching with dilute sulphuric acid, grinding the residue, roasting, leaching with dilute sulphuric acid, adding fresh matte to bring up the weight to about that of the original batch, leaching with dilute sulphuric acid, roasting, and fractional leaching with dilute sulphuric acid.

7. A process of separating nickel and copper, which includes the steps of grinding the matte to about ten mesh, leaching with hot dilute sulphuric acid, grinding the residue, roasting at a temperature of about 400° C., leaching with dilute sulphuric acid, and adding fresh matte to bring up the weight to about that of the original batch, leaching with dilute sulphuric acid, roasting this residue at a temperature of about 400° C., leaching with dilute sulphuric acid and adding fresh matte to bring up the weight to about that of the original batch again, and leaching with dilute sulphuric acid.

Signed by us this 24th day of April, 1926.

WILLIAM J. HARSHAW.
GEORGE L. HOMER.